Aug. 5, 1924.                                                                1,503,914
J. C. PARSONS ET AL
ILLUMINATING ATTACHMENT FOR TEMPERATURE INDICATORS
Filed Dec. 10, 1920
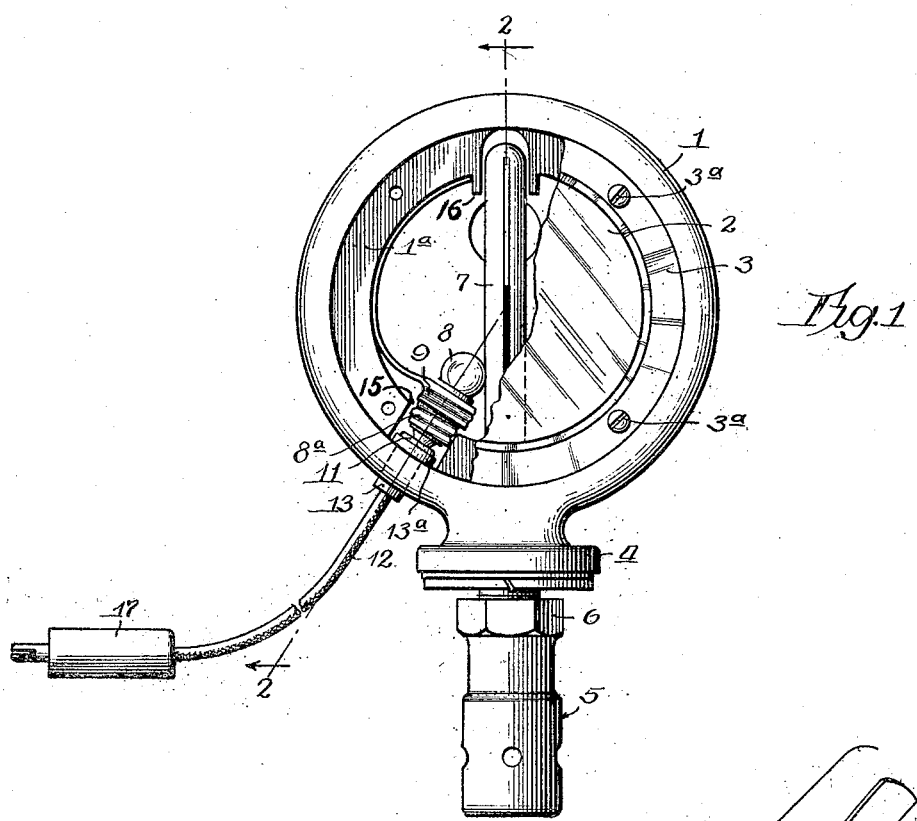
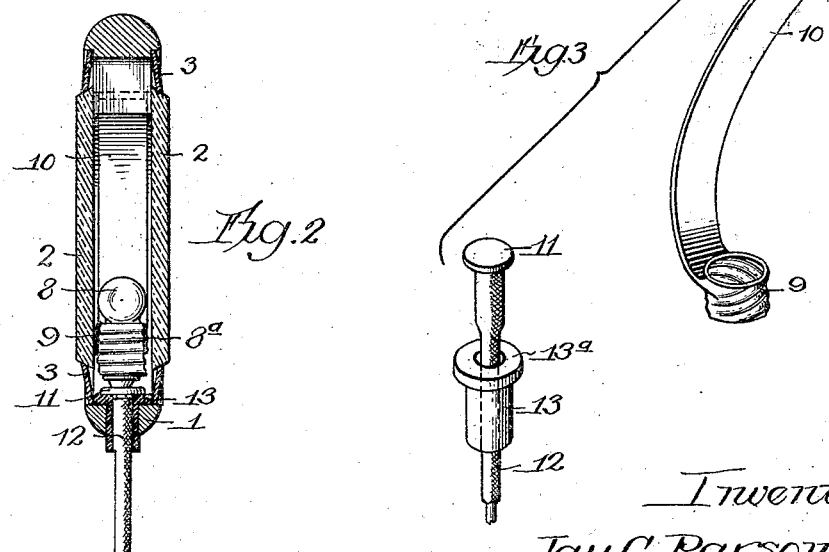
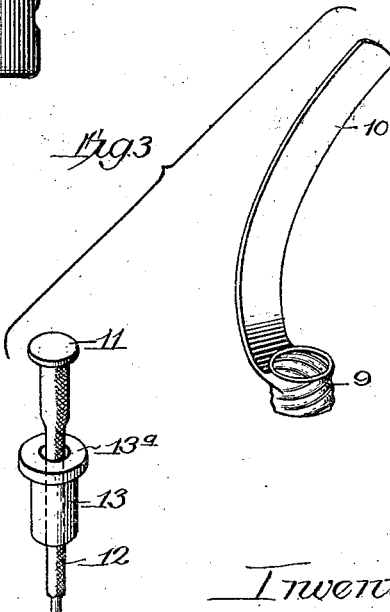
Inventors:
Jay C. Parsons,
Louie W. Sigens.
By Offield, Poole & Hinton
Attys.

Patented Aug. 5, 1924.

1,503,914

UNITED STATES PATENT OFFICE.

JAY C. PARSONS AND LOUIE W. SILVIS, OF CHICAGO, ILLINOIS.

ILLUMINATING ATTACHMENT FOR TEMPERATURE INDICATORS.

Application filed December 10, 1920. Serial No. 429,662.

*To all whom it may concern:*

Be it known that we, JAY C. PARSONS and LOUIE W. SILVIS, citizens of the United States, and residents of Chicago, in the county of Cook and State of Illinois, have invented certain new and useful Improvements in Illuminating Attachments for Temperature Indicators, of which the following is a specification.

This invention relates to improvements in illuminating attachments for temperature indicators, and more particularly to the application of an electric lamp to a "moto-meter," this being the name commonly given to temperature indicators for motor vehicles, and serving as a visual index of the performance of the motor by registering the temperature of the cooling water in the radiator.

These devices are ordinarily mounted upon the filler cap of the radiator and in direct line of vision of the driver, and while the indicating element is easily observed by day-light, is quite obscure after dark under normal driving conditions. The purpose of this invention is to provide a simple and inexpensive illuminating device adapted to be readily applied not only to the so-called moto-meter, but within the casing or glass enclosed cavity housing the fragile temperature indicator thereof, the application being accomplished with practically little or no alteration or disfigurement of the device.

The novel features of the invention will now be disclosed in detail in connection with the accompanying drawings, in which—

Fig. 1 is a view in front elevation of a moto-meter with a portion broken away to show the illuminating attachment applied, Fig. 2 is a cross-sectional view taken on line 2—2 of Figure 1, and Fig. 3 is a view in elevation of the parts comprising the attachment, removed and disassembled.

As well known in the art of temperature indicators, a "moto-meter" comprises an annular frame 1, in the form of a ring of cast metal, having its opposite faces recessed to receive glasses 2—2 and retaining rings 3—3 secured to the frame by means of screws 3ª. The parts thus assembled form an annular hollow casing mounted upon a base 4 integral with the frame 1, and from which depends a bulb-like member 5 surrounding the contact element of the temperature indicating unit of the device, and which extends into the radiator and is subject to direct contact with the water, or steam, if the latter is present. A nut 6 above the member 5 engages a threaded shank, not shown, and serves as a means for fixing the device to the filler cap of the radiator. A glass capillary tube 7 extends upwardly from the contact element within the member 5, and occupies a vertical position within the casing, and containing a quantity of liquid such as alcohol, which rises and falls in the tube with the variation in temperature, according to the well known physical laws, long since applied in the making of thermometers.

Based on the theory that the temperature of the cooling water is an index of motor performance, the moto-meter thus fulfils its function as the indicator of operating conditions, and hence to enable the indications to be readily observed at all times and under all driving conditions. The application of an illuminating device is proposed as a means of illuminating the interior of the casing, thus making it possible to observe the height of the liquid in the tube.

Reduced to its simplest form, the illuminating device consists of a small incandescent lamp 8 (Fig. 3) having a threaded base 8ª adapted to be screwed into a lamp socket 9 which is mounted at one end of a strip of thin metal 10, in the nature of a flat spring, preferably bent in curved form. The base of the lamp 8 is adapted for contact with a contact plate 11 fixed to the end of a conductor 12 which passes through an insulating fiber bushing 13, provided with a flange 13ª at its outer end. The manner in which the parts just described are mounted in the moto-meter and the necessary preparation or alteration required to receive the same, will be understood from the following: As shown in Figures 1 and 2 the annular frame 1 is recessed to receive the glass 2 and retaining rings 3, in such a manner that an annular flange 1ª of reduced thickness extends around the inner periphery thereof, and it is to this flange that the screws 3ª of the retaining rings are anchored. At some point in the flange 1ª, for instance to one side of and adjacent the base of the tube 7, is cut a slot or recess 15, to the full depth of the flange, this slot being of sufficient width to receive the base of the lamp 8 and socket 9. The slot being formed, a small hole is drilled radially through the frame 1 to the central portion of the slot 15. Within the hole thus drilled is inserted from the inner end thereof the fibre bushing 13, the flange 13ª bearing against the base of the slot. The conductor 12 with the contact plate at the end is then passed through the bushing so that said plate rests upon the inner end of the bushing. The lamp 8 and socket 9 are now inserted (it being understood that one of the glass 2 and rings 3, or both, are removed in making the alteration and installation) the socket (with or without the lamp therein) being preferably placed in the slot, and the strip 10 sprung into place, in contact with the curved surface of the flange 1ª immediately beyond this slot. It is to be noted that there are small radially extending lugs 16 on either side of a small recess formed in the flange to receive the upper end of the tube 7. By inserting the strip so that its end bears against the adjacent lug 16, it will act to firmly hold the socket in place by reason of the tension exerted thereby. The lamp 8, thus held within the socket, bears at its base against the contact plate 11, which is insulated from the frame 1 by the bushing 13, as is the conductor 12, it being preferably of the insulated variety of wire. A connecting member 17 (Figure 1), is provided at the end of the conductor, whereby electrical connection may be established between the lamp and the source of electric current, such as the storage battery of the vehicle. Assuming that the conductors from the storage battery forms one side of the lamp circuit, the other or return circuit is provided through the metal parts of the moto-meter, and hence to the vehicle frame, in the manner commonly employed in vehicle lighting circuits, it being apparent that the socket 9 is "grounded" to the frame 1 through the strip 10.

The arrangement thus described provides a very simple and efficient method of equipping a moto-meter with an electric lamp, serving the purpose already indicated. The advantage of this arrangement resides in the mounting of the lamp within the casing and in close proximity to the tube 7, so that its light is shed in a way to produce the best illuminating effect. In addition, the protected location of the lamp is a desirable feature, as well as its almost complete concealment of the parts. The simplicity of the parts and ease of installation, coupled with the absence of destructive and disfiguring preparations for attachment are advantages that appeal strongly to the user.

Having described the invention in its preferred embodiment, what we claim as new and novel is:

1. The combination with a temperature indicator comprising an annular casing provided with transparent faces on opposite sides, of an illuminating attachment mounted in said casing and comprising a lamp, a lamp socket a recess for engaging the lamp socket, and a yieldable metallic strip fixed to said socket, and adapted to be yieldably held against the annular wall of said casing, and prevented from slipping by the engagement of the socket in the recess.

2. In a temperature indicator of the character described, the combination of an illumination device therefor, comprising a lamp, a lamp socket, a metallic strip fixed to said socket, said socket being adapted to be inserted in a recess formed in the inner annular wall of said casing, and said strip to be yieldably retained in contact with said wall and prevented from slipping by said recess, and a conductor extending through said wall and having electrical contact with said lamp.

3. In a temperature indicator of the character described comprising a frame of ring form having glasses mounted on opposite sides to form a casing, and a temperature indicating element in said casing, of a lamp, a lamp socket insertable in a radial recess formed in the inner annular wall of said casing, and a metallic strip connected with said lamp and adapted to be bent in arc form to engage and be yieldably held in contact with said wall of the casing.

4. An attachment for temperature indicators of the character described, comprising a lamp, a lamp socket adapted to be inserted in a recess formed in the frame of said indicator, a metallic strip connected with said lamp socket and adapted to yieldingly engage the wall of said frame adjacent said recess, and a conductor extending through a bore formed in said frame and adapted for electrical contact with said lamp.

5. In a temperature indicator of the character described, comprising a frame of ring form having glasses mounted on opposite sides to form a casing, and a temperature indicating element in said casing, of a lamp, a lamp socket insertable in a recess formed in the annular wall of said casing, a metallic strip connected with said lamp and adapted to be bent in arc form to engage and be yieldably held in contact with said wall of the casing, and an electrical contact member in said recess, and insulated from said frame.

6. In a temperature indicator of the character described, the combination of an illumination device therefor, comprising a lamp, a lamp socket, a metallic strip fixed to said socket, said socket being adapted to be inserted in a recess formed in the inner annular wall of said casing, and said strip to be yieldably retained in contact with said wall, and a conductor extending through said wall and connected with a contact plate at the bottom of said recess, said plate being adapted for electrical contact with said lamp.

In witness whereof, we hereunto subscribe our names this 7th day of December, A. D., 1920.

JAY C. PARSONS.
LOUIE W. SILVIS.